UNITED STATES PATENT OFFICE 2,077,167

METHOD OF MAKING PIGMENTED PROTECTIVE COATINGS

Jean Crouet, Saint Just-en-Chaussee, France, assignor to Weeks & Co. (London) Limited, Middlesex, England, a limited British company No Drawing. Application May 9, 1933, Serial No. 670,217. In France May 10, 1932

5 Claims. (Cl. 134—58)

The present invention is based on the discovery that if the particles of a finely ground pigment are each enclosed by a film of only mono-molecular thickness they will be thereby deflocculated, no matter how finely ground, and consequently an even layer of varnish, with a uniform distribution of such pigmentation may be obtained, which varnish layer, when applied to a surface in the usual way by brushing or spraying or dipping, has great covering power and presents a particularly smooth surface The pigment in such a varnish also has a particular tendency to remain in suspension rather than form a deposit in the container, which is most important.

Manufacturers of ordinary pigments can supply such pigments ground to very small dimensions for each particle but very finely ground pigment particles of heretofore known character absorb or adsorb air and moisture which aggravate their tendency to adhere together, preventing the suspending media from thoroughly enveloping them.

When being ground by the known processes together with the suspending vehicle the particles of ordinary pigments become electrified with static electricity, and such charged particles adhere one to another in the well known way by electrical attraction, and a flocculation results which produces little lumps or agglomerates in the suspending vehicle and gives a speckled appearance to the varnished surface.

This flocculation is avoided, as I have discovered, by the use of a material or materials producing a coating of only monomolecular thickness which has an affinity for the pigment particles sufficient to cause it to coat each one of them, if present in just the proper quantity to secure that result.

This much desired deflocculation I believe to be due to the fact that such mono-molecular layer when thus used, particularly if formed of a compound having a long hydrocarbon chain on one side of the layer and with a carboxyl group on the other side rendering it a polar-nonpolar compound, produces coated pigment particles which all have surfaces of the same electrical charge, so that they mutually repulse, rather than attract, one another. By the term "polar-non-polar" I mean that the long hydrocarbon chain forming each molecule has one of its extremities of an ionizing character and its other extremities not ionizing Such molecular layers of one molecule in thickness may be easily obtained from certain fatty acids, or from their glycerolic esters, or from ricinoleic acids, or from various other materials known to those skilled in the art, if properly calculated quantities thereof are used.

Among the fatty acids or their esters most suitable for the purpose of this invention may be mentioned raw or oxidized linseed oil, Chinawood oil (raw or oxidized) hempseed oil, soya bean oil, raw or oxidized or cooked castor oil, and other fatty acids (up to those having 27 atoms of carbon).

Pigment particles so coated may be mixed with any other proper and usual materials according to the use to which the resulting varnish or paint is to be put. Thus a collodion solution containing nitrocellulose, any suitable plasticizer, a resin and proper solvents, or any one of said solids which I regard as equivalent for my purpose, may be used.

To obtain a paint which can be applied by spraying for house painting, a supplemental quantity of oil or of several oils might be added, giving thereby a coating of great durability.

Varnishes or other solutions pigmented according to my process have great flowing and hiding power. By the term "hiding power" I mean the ability possessed by even a thin film of the material to not only cover, but also conceal, a large area of the surface to which it is applied. Also, if subjected to the standard tests of expulsion through a fine orifice it will be found by comparison of the initial pressures necessarily exerted that the inertia of the liquid passing through the orifice at the commencement of flow will be considerably reduced for varnishes or paints made according to my process, as compared with those heretofore in use, showing thereby an increased flow value. This characteristic enables coats of varnish made according to my invention to level out evenly in drying, thus producing a smooth surface of uniform appearance. It also enables adjacent areas of varnish, applied successively to a surface, to coalesce completely, thus leaving no lines of demarcation, or color variation, between areas successively covered by brushing or spraying.

To give one specific example of the manner in which my invention may be carried out, I may proceed as follows: 10 kilograms of titanium dioxide of ordinary commercial quality, and 20 kilograms of a mixture of equal parts of toluene and benzene, free from grease, are placed in a carefully cleaned pebble mill, and to this mixture is added just enough cooked China wood oil to form a coating layer of only monomolecular thickness around each of the pigment particles. The amount of oil needed for this may be calculated in a manner well known in physical chemistry, as follows:

The average diameter of a number of pigment particles is obtained by measuring the same under the microscope after the body of pigment from which they have been taken has been ground for a predetermined period of time which is fixed for each pigment material. If we assume that such average diameter is .7 mu (=.0007 mm.) it is easy to calculate the surface area of the average particle on the assumption that it is of substantially spherical shape. The specific gravity of the pigment is then determined, which in the case of titanium dioxide would be 4.2, and from these figures one can determine the number of pigment particles in a mass of one kilogram weight and the total surface area thereof, which would be about 2080 square meters on the data above assumed. The surface which will be covered by a layer of only monomolecular thickness formed from one gram of cooked China wood oil is known in physical chemistry to be about 879 square meters. From this it follows, by dividing 879 into 20800 (the surface area in square meters of the particles in 10 kilograms of the titanium dioxide) that 23.6 grams of China wood oil will be needed to produce these coatings for the 10 kilograms of titanium dioxide particles. This amount of oil is then added to the pebble mill and the latter maintained in operation for about 20 hours. Thereafter the ground contents of this apparatus are transferred to any suitable mixing machine, such as that known as the Werner mixer, and the proper amounts of nitrocellulose, of any suitable plasticizer, and of the desired solvents, gums and diluents, required by good varnish making practice are added and thoroughly mixed by operation of the last mentioned apparatus.

While anyone sufficiently skilled in the art could calculate in the above manner the amount of fatty acid needed to completely cover the particles of a given quantity of a particular finely ground pigment with a coating of such acid having only monomolecular thickness, I believe that I am the first to discover or realize that the use of such exact quantity of the fatty acid will practically destroy the tendency of finely ground pigments to flocculate, and will thereby make it possible to use such finely ground materials and so increase the covering power of a given quantity of the pigmented product, besides improving the quality of the pigmented film produced by the use of a paint or lacquer made in accordance with my said discovery.

The values given above are calculated from a general formula which is derived as follows:

Suppose D represents the average diameter of particles supposed to be of spherical shape, and P represents the specific gravity of the pigment body, the number of pigment particles contained in one gram of pigment is represented by the following formula:

$$\frac{1}{\text{weight of a particle}} = \frac{1}{\frac{\pi D^3}{6} \cdot P}$$

The surface area of a particle is $$\pi D^2;$$

then the total surface area developed by all of the particles contained in one gram of pigment is:

Surface area of one particle $x$ number of particles contained in one gram of pigment, or $$\frac{\pi D^2}{\frac{\pi D^3}{6} \cdot P} = \frac{6}{D.P.}$$

The amount of fatty acid to be used with one gram of pigment in order to coat the particles with a monomolecular layer must develop a surface area of $$\frac{6}{D.P.},$$

which is, as pointed out above, the surface area developed by the particles of one gram of pigment.

Now, suppose further:

S represents the surface area developed by one gram of a certain fatty acid when floated upon a surface of water in a true monomolecular layer.

Then the amount of this acid to be used with one gram of pigment of average particle diameter D and specific gravity P is:

$$\frac{6}{D.P.S.} \text{ (c.g.s. units.)}$$

D is measured by a microphotographical method using ultra sensitive plates.

P is measured with a pyknometer by a standard method.

S is determined experimentally, and it is found by experiment that the average area of the monomolecular film developed by one gram of oleic acid, for example, is about 1,000 square meters.

Another procedure which might be followed is to take 20 kilograms of titanium oxide, 5 kilograms of benzene, 5 kilograms of toluene and 45 grams of China wood oil previously dissolved in the benzene, work this mass in a suitable mixing apparatus, and then add the nitrocellulose, plasticizer, gum and solvent as desired. In both examples the last mentioned group of constituents may be added separately to the original mixture containing the pigments, hydrocarbons, China wood oil, etc., as the mixing process proceeds, or such last mentioned constituents may be mixed together in a separate apparatus and then added to the first, or pigment containing mixture, in a body, and the necessary subsequent mixing operation performed.

It will be seen from the above description that the present process starts with a commercial pigment which is procurable, in the usual commercial form, on the open market. The process renders this pigment completely deflocculated when incorporated in a vehicle and comprises determining the particle size and specific gravity of a selected quantity of the commercial pigment, determining from this particle size and specific gravity the exact amount of a substantially water-insoluble and non-volatile fatty acid or ester thereof required to produce a coating of true mono-molecular thickness on every pigment particle in the selected quantity of the pigment, dissolving the said quantity of fatty compound in an organic solvent which is freely miscible with the chosen vehicle in which the pigment is to be incorporated, and incorporating the resulting fatty acid compound solution in the said quantity of the commercial pigment, the mixing being done with the pigment in water-free condition, whereby the pigment may be completely dispersed in the vehicle without subsequent grinding after the admixture of the fatty compound, the pigment remaining completely dispersed in the vehicle for indefinitely long periods of time without tendency to flocculate.

The utilization of the organic solvents for the fatty compound assures an equal distribution of the compound over all of the particles of the pigment in the quantity of pigment which is being treated, thereby assuring the production of a true mono-molecular coating on all of the particles of the pigment.

The result of this process is a pigmented mixture, varnish, lacquer or paint, which has a remarkable flow and covering power and produces a varnish-like coating which has absolute uniformity of color and pigmentation throughout, has a uniform levelling surface tension while drying, and is of great durability. An additional characteristic of great commercial advantage is that such pigments remain in suspension while in storage for indefinite periods of time.

These characteristics I have found to result only when the proportions of the constituents are carefully calculated as before explained so as to produce the fatty acid covering film of only monomolecular thickness. Whether this result is due to electrical conditions has no particular bearing on the practical success of the process, however various changes might be made in the proportions of the ingredients above given, and chemical or physical equivalents might be substituted for some of them, without departing from the underlying principle of my invention, so long as the resulting coating of only monomolecular thickness for each pigment particle is produced.

Having described my invention, I claim:

1. The process for treating a pigment for rendering it completely deflocculated when incorporated in a vehicle, which comprises determining the particle size and specific gravity of a selected quantity of a commercial pigment, determining from this particle size and specific gravity the amount of a substantially water-insoluble fatty acid compound of the class consisting of the fatty acids of glyceride oils and fats and the glycerol esters thereof required to produce a coating of true mono-molecular thickness on every pigment particle in the selected quantity of the pigment, dissolving the said quantity of fatty acid compound in an organic solvent which is freely miscible with the chosen vehicle in which the pigment is to be incorporated, and incorporating the resulting fatty acid compound solution in the said quantity of the commercial pigment, thereby directly producing a water-free pigment composition that can be completely dispersed in the said chosen vehicle and remains completely dispersed in the vehicle for indefinitely long periods of time without tendency to flocculate.

2. The process for treating a pigment which comprises providing previously finely ground particles of the selected commercial pigment, determining the amount of a substantially water-insoluble fatty acid compound of the class consisting of the fatty acids of glyceride oils and fats and the glycerol esters thereof required to coat every particle of the pigment with a coating of the fatty acid compound of only true mono-molecular thickness, and uniformly incorporating such amount of the said compound in solution into the pigment in water-free condition, whereby the pigment remains completely deflocculated when the resultant pigment composition is incorporated in a selected vehicle.

3. A process for treating a pigment which comprises providing previously finely ground particles of the selected commercial pigment, determining the amount of a substantially water-insoluble fatty acid compound of the class consisting of the fatty acids of glyceride oils and fats and the glycerol esters thereof required to coat every particle of the pigment with a coating of the fatty acid compound of only true mono-molecular thickness, and incorporating such amount of the said composition in solution into the pigment in water-free condition so that every particle of the pigment becomes coated with a layer of fatty acid of true mono-molecular thickness in which the individual molecules of the fatty acid compound are believed to be all similarly oriented electrically, radially of the particle of pigment to which the coating adheres, whereby the pigment composition remains completely deflocculated when the resultant pigment composition is incorporated in a selected vehicle.

4. The process for treating a pigment which comprises providing previously finely ground particles of the selected commercial pigment and incorporating in a selected quantity of the said pigment in water-free condition a calculated amount of China wood oil dissolved in benzene sufficient to produce a coating of the China wood oil of only true mono-molecular thickness on every particle of the pigment, whereby the said pigment, when incorporated in a vehicle will remain in a completely deflocculated and dispersed condition for indefinitely long periods of time without tendency to become flocculated.

5. The process for treating a pigment for rendering it completely deflocculated when incorporated in a vehicle, which comprises determining the particle size and specific gravity of a selected quantity of a commercial pigment, calculating therefrom the total surface or area of the particles of the said quantity of the pigment, coating the said pigment particles with a non-volatile, water-insoluble substance of the class consisting of the fatty acid of glyceride oils and fats and the glycerol esters thereof by adjusting the quantity of the said substances to the total surface of the pigment particles in order to obtain only a true mono-molecular coating of the said substances on every particle of the pigment by dissolving the said quantity of the substance in a solvent freely miscible with a selected vehicle, and incorporating the solution of the said quantity of the said substance into the water-free pigment to produce the said true mono-molecular coating of the said substance on the particles of the pigment, thereby directly producing a water-free pigment composition that can be completely dispersed in the said selected vehicle.

JEAN CROUET.

CERTIFICATE OF CORRECTION.

Patent No. 2,077,167.  April 13, 1937.

JEAN CROUET.

It is hereby certified that error appears in the printed specification of the above numbered patent requiring correction as follows: Page 3, first column, line 51, claim 1, before the word "true" insert only; and second column, line 20, claim 3, for "composition" read compound; line 54, claim 5, for "acid" read acids; lines 55 to 58 inclusive, same claim, strike out "adjusting the quantity of the said substances to the total surface of the pigment particles in order to obtain" and insert instead choosing such quantity of the said substance as will provide; line 59, same claim 5, for "substances" read substance; and that the said Letters Patent should be read with these corrections therein that the same may conform to the record of the case in the Patent Office.

Signed and sealed this 13th day of July, A. D. 1937.

Henry Van Arsdale (Seal)  Acting Commissioner of Patents.